June 2, 1970   R. M. ALTMAN ET AL   3,515,480
OPTO-ELECTRONIC RADIANT ENERGY BEAM RANGE FINDER
Filed July 24, 1967   4 Sheets-Sheet 1
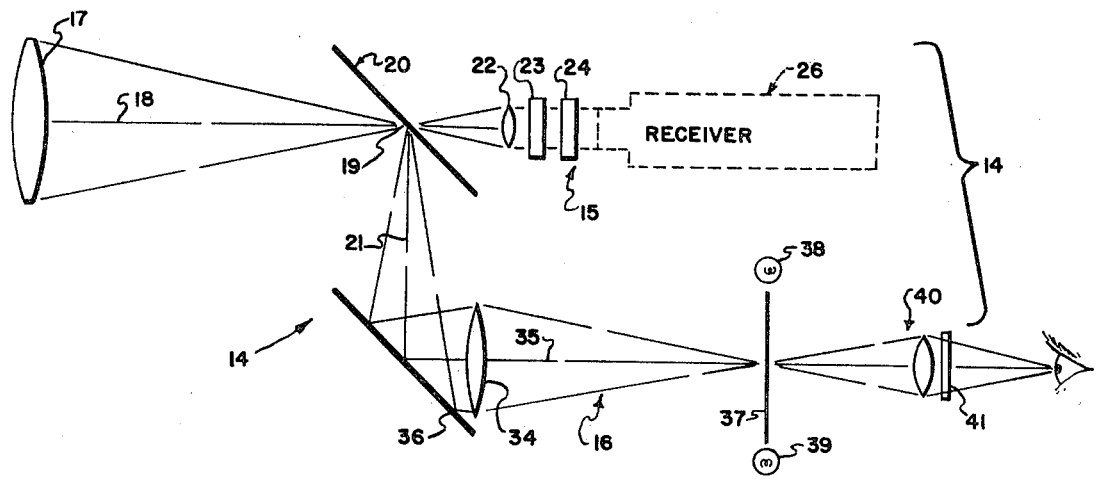
FIG. 2
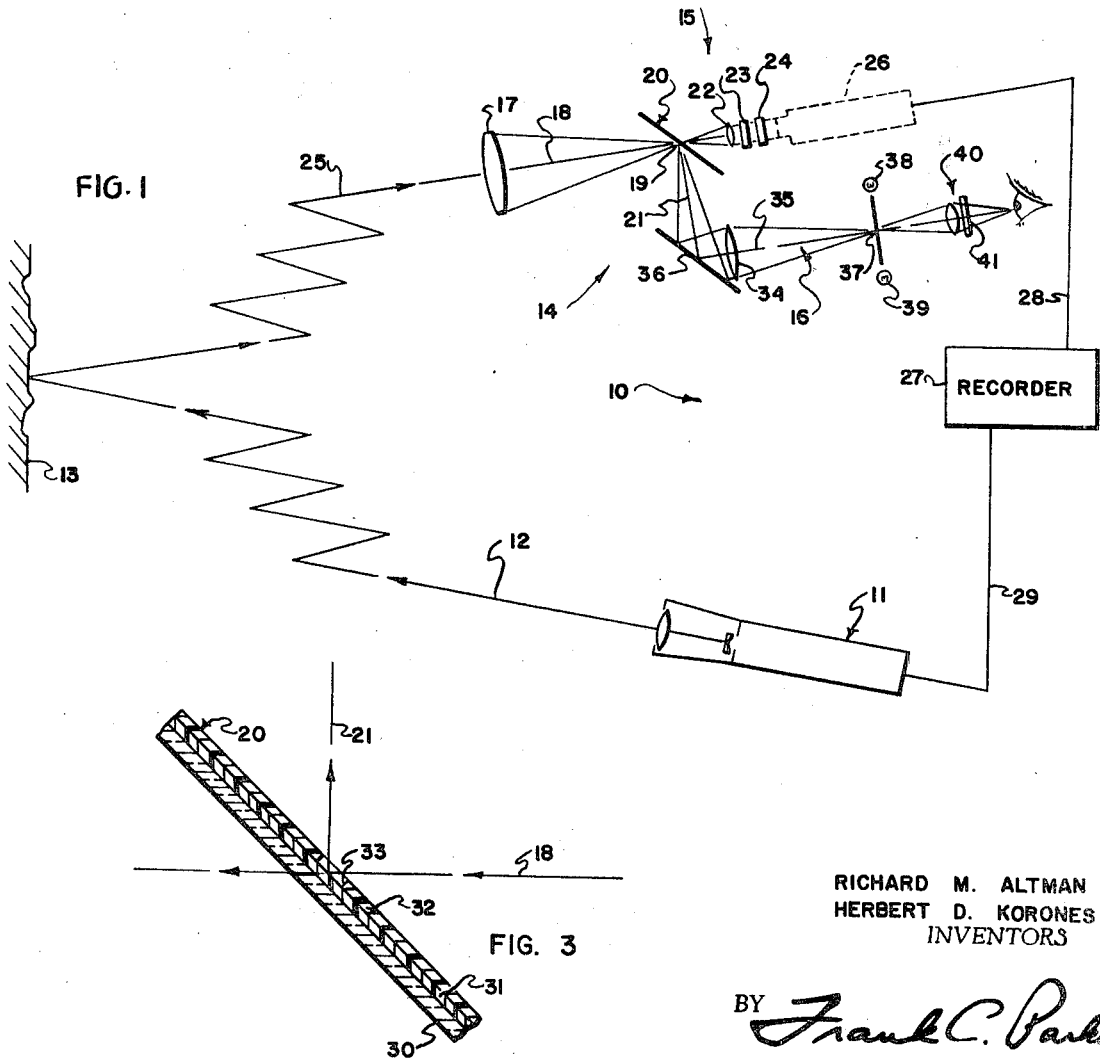
FIG. 1
FIG. 3
RICHARD M. ALTMAN
HERBERT D. KORONES
INVENTORS
BY Frank C. Parker
ATTORNEY

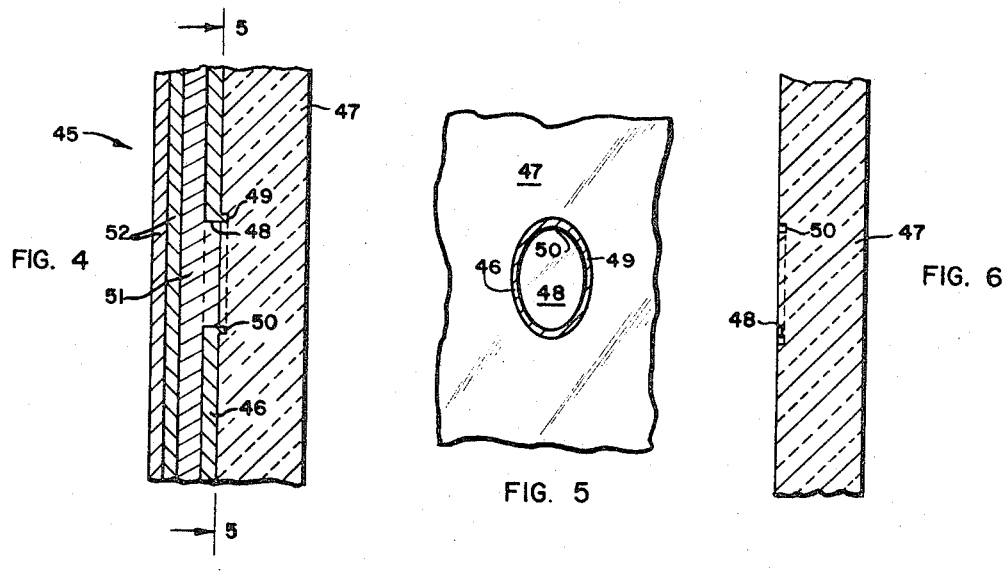
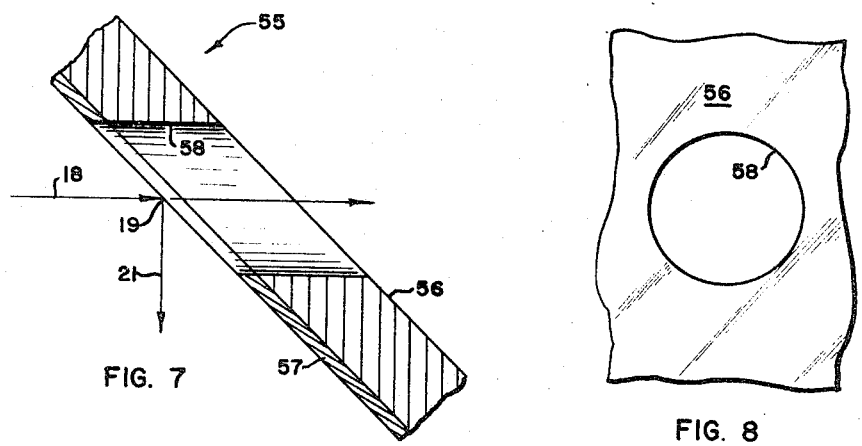

RICHARD M. ALTMAN
HERBERT D. KORONES
INVENTOR.

BY Frank C. Parker

ATTORNEY

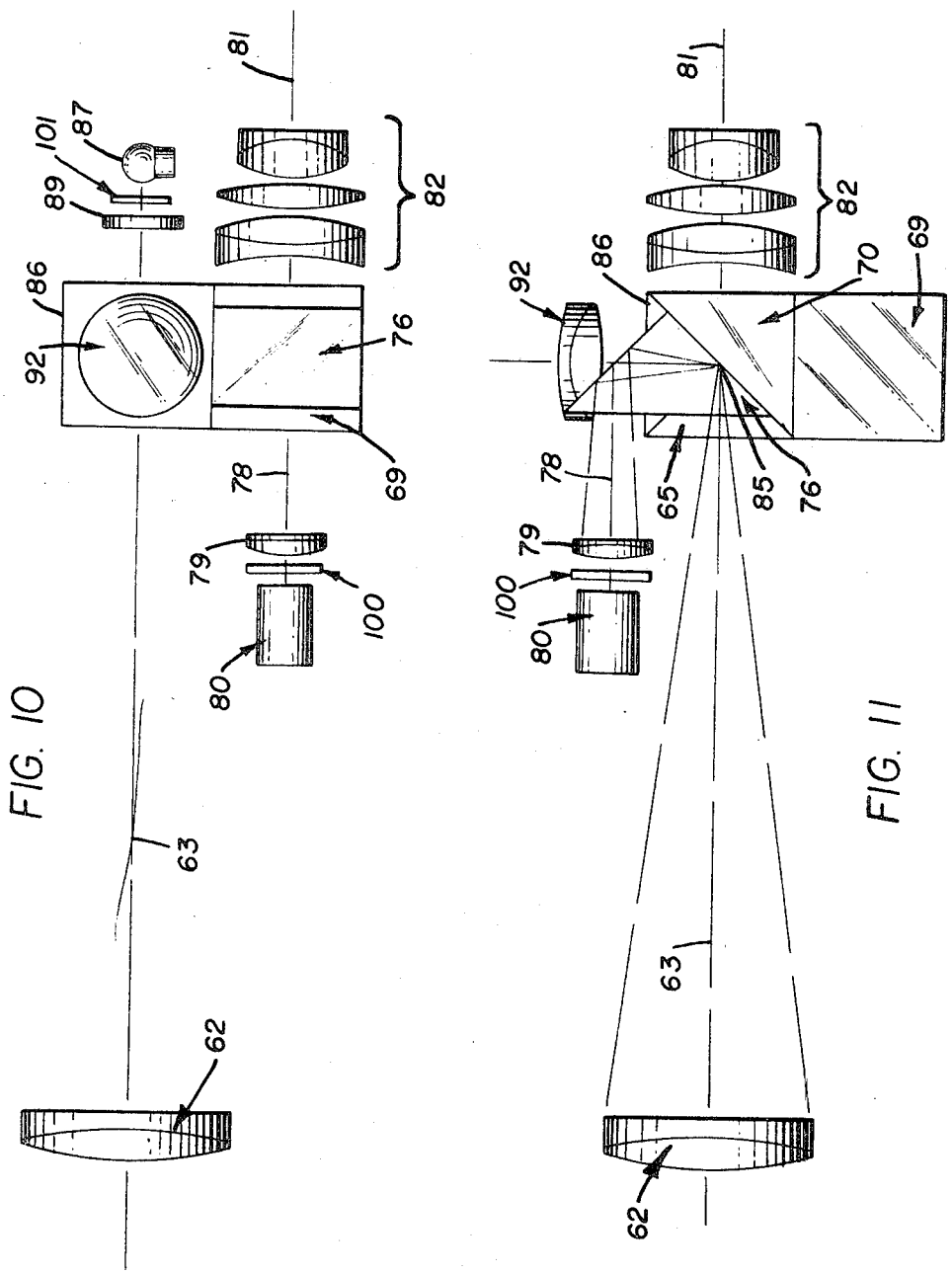

United States Patent Office 3,515,480
Patented June 2, 1970

3,515,480
OPTO-ELECTRONIC RADIANT ENERGY BEAM RANGE FINDER
Richard M. Altman, Beverly Hills, Calif., and Herbert D. Korones, Brighton, N.Y., assignors to Bausch & Lomb Incorporated, Rochester, N.Y., a corporation of New York
Continuation-in-part of application Ser. No. 332,128, Dec. 20, 1963. This application July 24, 1967, Ser. No. 660,553
Int. Cl. G01c 3/00
U.S. Cl. 356—4
11 Claims

ABSTRACT OF THE DISCLOSURE

An opto-electric long distance range finder comprising means for projecting a small extremely coherent and monochromatic pulsed radiation such as a laser beam upon a distant solid object, the beam which is reflected from said surface being received by complex receiving apparatus including an optical telescope which views said object and a radiation pulse sensing electrical device which simultaneously receives the incoming radiation pulses and evaluates the time displacement thereof against the pulsed transmitted beam to yield a range value.

CROSS-REFERENCE TO RELATED APPLICATIONS

The present patent application is a continuation-in-part of application Ser. No. 332,128, filed Dec. 20, 1963, now abandoned.

BACKGROUND OF THE INVENTION

The present invention relates generally to radiation receptors and more particularly it relates to opto-electric range finders and the like which utilize the reflected component of an outgoing radiant energy beam such as that produced by a laser device.

The development of a range finder capable of measuring great distances accurately has been hindered heretofore by reason of the fact that the radiated signal which is sent out from a radiating source fans out in a relatively wide arc which destroys its directional quality and results in reflected radiation from many objects being received by the receptor and being indistinguishable at the receiving end of the apparatus from radiation reflected from the object whose range is to be measured. Even the best possible collimation obtainable in a projected beam using either the conventional optical or electrical lenses does not produce a sufficiently small target impact area on a distant object which would make it useful to overcome the above-mentioned defect.

With the advent of the so-called laser radiation device, the projected beam is characterized by a nearly perfect state of collimation or unidirectional rays so that even though tremendous distances are traveled by the beam, very little spread of the beam is noticed on the impingement area of a distant target surface or object. This property of laser beams makes such beams especially useful in all optical apparatus which require near perfect monochromaticity and collimation.

Another object of the invention is to provide such a device wherein its optical parts are rigidly constructed in fixed alignment optically and wherein a buried optical surface is provided on which a reticle may be formed in a protected trouble-free position.

In view of the above-mentioned considerations, it is the principal object of the present invention to provide a long distance range finder by the use of a radiant energy beam, such as, for instance, a laser beam projection apparatus, which is combined with a receiving apparatus for the purpose of greatly increasing the accuracy of range determination with particular regard to relatively small discete areas on a distant target.

A further object of the present invention is to provide such a device wherein a radiation receiving telescope is combined functionally and structurally with a sighting telescope for viewing and receiving a beam from a distant object in such a manner that each telescope is automatically collimated precisely to the other telescope.

It is a further object of this invention to provide such a device which is structurally and optically compact with resultant lightweight and sturdy construction.

A still further object of the present invention is to provide such a device which permits excellent directional determination and is constructed as a two-unit system embodying a transmitter unit and a receiver-sighting unit, whereby the entire apparatus is simplified and made more portable than heretofore and wherein economies are effected in cost and maintenance thereof.

Further objects and advantages reside in certain details of construction and arrangement and combination of parts of the invention, a full disclosure of which is given in the specification herebelow taken in connection with the accompanying drawings, in which:

BRIEF DESCRIPTION OF THE DRAWINGS

FIG. 1 is a schematic diagram showing a preferred form of the present invention;

FIG. 2 is a schematic diagram showing a certain combination of parts within the general range finder apparatus;

FIG. 3 is a sectional view of one of the operating parts of the range finder;

FIG. 4 is a midsectional view partly broken away of one form of an operating part of said invention;

FIG. 5 is a sectional view taken on the line 5—5 of FIG. 4;

FIG. 6 is a midsectional view partly broken away of one of the elements shown in FIG. 4;

FIG. 7 is a midsectional view partly broken away of a modification of the operating part mentioned in the description of FIG. 4;

FIG. 8 is a side elevation partly broken away of the part shown in FIG. 7;

FIG. 10 is a plan view of the telescope shown in FIG. 9;

FIG. 11 is a side elevation of the telescope shown in FIG. 9;

DESCRIPTION OF THE FIRST FORM OF THE INVENTION

Figure 9:
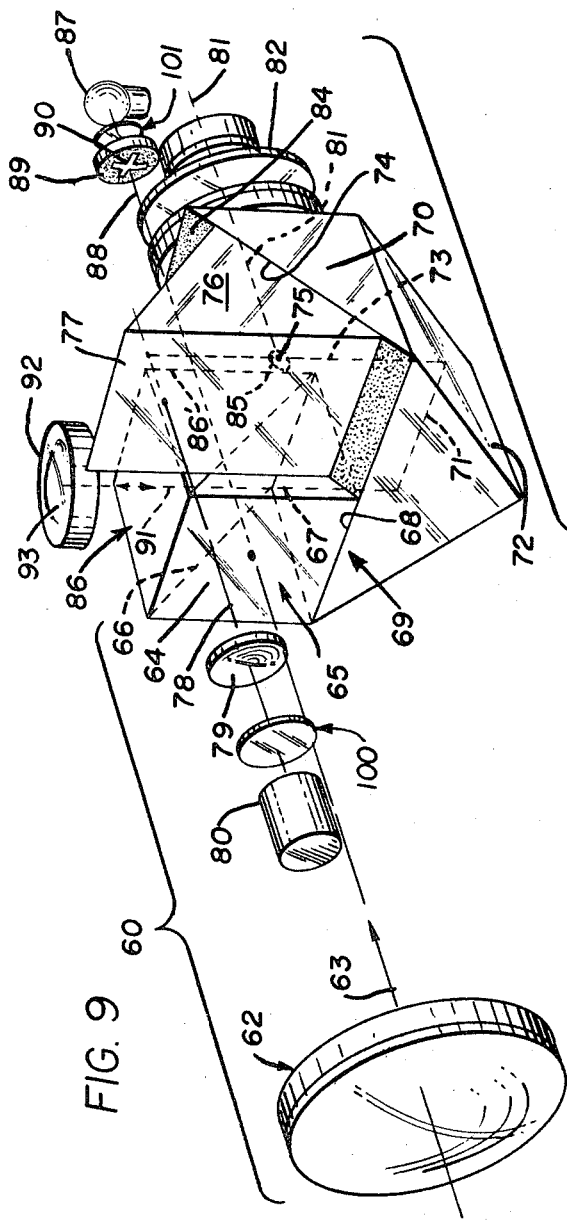
FIG. 9 is a perspective view of the parts of the telescope arrangement used in a second form of the invention.
Figure 12:
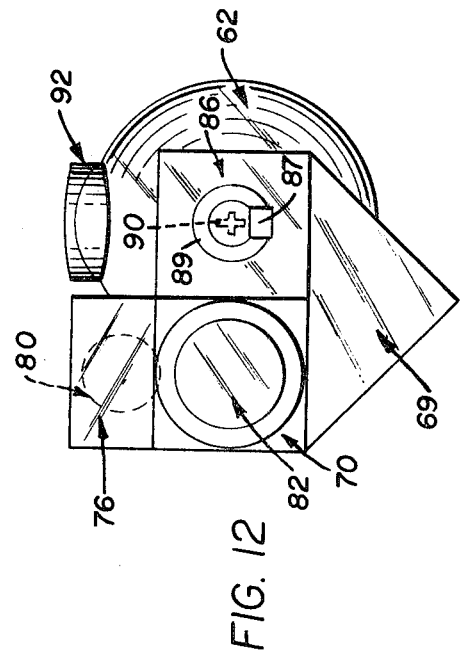
FIG. 12 is an end view taken from the eyepiece side of the telescope shown in FIG. 9.

With particular reference to FIG. 1, the range finder apparatus is generally represented by the numeral 10 and comprises a unidirectional radiant beam transmitter unit 11 which is preferably constructed as a laser beam emitting device in which the projected beam 12 is very highly monochromatic in character and is extremely well collimated so that the effect of spreading of the beam when projected for extremely great distances is remarkably small and of the lowest practical amount.

The projected radiant energy beam 12 impinges on a distant object 13 which may be characterized by an uneven or undulating surface and is reflected therefrom along a reflected beam 25 to be received in a receiver-sighting unit generally designated by the numeral 14.

One of the outstanding features of this invention is the combination and construction of the parts of the assembly 14, said assembly having in combination a receiver-telescope 15 and a sighting telescope 16. Both telescopes 15 and 16 have in common an objective lens 17 which is spaced along an optical axis 18 from its prime focal point 19 formed rearwardly thereof. Intersecting the focal point 19 or some relayed focal point formed rearwardly thereof along the axis 18, a beam divider 20 is located, said divider intersecting point 19 at an angle so as to deflect part of the rays which impinge thereon along a lateral optical axis 21 into said sighting telescope 16. Spaced from the beam divider 20 rearwardly along the optical axis 18 is a collimating lens 22 which collimates the transmitted beam, said rays being projected through a suitable polarizer 23 and a subsequent monochromatic filter 24 which permits only radiation of a character emitted by the transmitter to pass and to be detected by the receiver.

From the filter 24 the transmitted beam enters the receiver or radiant energy sensing device 26 which is electrically connected to a reader and/or recorder device 27 by a lead 28, said reader being connected by a suitable lead 29 to said transmitter unit 11 so that a pulse, which is emitted by the transmitter unit 11 and which will be reflected from the distant object 13 along the return path 25 to the sensing device 26, can initiate a timing signal in the recorder 27 upon emission of the pulse from the transmitter unit 11 in order to define the start of the time period in which the radiant energy travels from the transmitter unit 11 to the distant object 13 and, after reflection, returns to the sensing device 26. The time lapse between the moment of sending and the moment of recording of the pulse is read by a suitably constructed reader or recorder mechanism in the reader device 27 as a measure of the range of the distant object 13.

It is apparent that the optical and structural combination of said receiving telescope 15 with said sighting telescope 16 inevitably results in a compact and sturdy unit which is light in weight and portable while being easier to maintain and lower in cost than separate telescopes.

More particularly, one of the novel features of the present invention concerns the means whereby auto-collimation of the two telescopes 15 and 16 is obtained. The aforesaid beam divider 20 is composed as best shown in FIG. 3 of a glass substrate 30 on which is deposited a multilayer dichroic film 31 having the property of transmitting all wave lengths of radiant energy above substantially 6000 Angstroms and reflecting radiant energy of wave length less than 6000 Angstroms. In contact with the multilayer film 31 is deposited a second film or coating 32 of aluminum which reflects all wave lengths of visible light. Most important, the center portion of the aluminum coating 32 is omitted to provide an elliptical aperture 33 through which the radiant energy of greater than 6000 Angstroms wave length will be transmitted to the sensing devcie 26. The aperture 33 constitutes the aperture stop for the receiver telescope 15. The order of deposition of the two films 32 (aluminum) and 31 (dichroic material) may be reversed when applied to the substrate 30 without in any way impairing their respective functions. The aperture 33 provided in the aluminum film 32 is essentially a diaphragm having a very small angular dimension which in one form of the invention is limited to substantially 1.0 milli-radian and this aperture is seen in the sighting telescope 16 by virtue of its contrasting appearance compared to the surrounding aluminum film 32 which is bright. To increase the ease of sighting of the central aperture 33, it may be circumscribed by an engraved demarcation ring which is suitably formed either in said films or in the substrate, as shown in FIGS. 4, 5 and 6.

Strict collimation of the receiving telescope 15 with the sighting telescope 16 is inherently obtained since the aperture 33 constitutes the sighting reticle for the sighting telescope 16 while simultaneously acting as a transmitting aperture for the receiving unit 15. The aperture 33 is used as a sighting point with respect to a suitable optical system in which an erecting lens 34 is focused on a reticle which is identified as the aperture 33. The axis 35 of said optical system is positioned substantially parallel to the axis 18 in the illustrated form of this invention by interposing a deviation mirror 36 between the aperture 33 and the lens 34 whereby the telescopes 15 and 16 are brought close together. Rearwardly of the erector lens 34 at a focal plane formed thereby is located a second reticle 37 which may be illuminated by lamps 38 and 39 of various contrasting color emitting properties which result in advantageous sighting of the reticle 37 under varying ambient illumination conditions.

It is contemplated that the reticle 37 may be provided with an aiming circle or alternately cross lines may be used which yield an advantage under adverse illumination conditions and greatly facilitate rapid and accurate location of the aiming point formed by the aperture 33 when suitably illuminated.

Still further rearwardly along the axis 35 is provided an eyepiece 40 which is focused on the reticle 37 and which furthermore may contain a suitable color filter 41 for the protection of the eye of the observer. It is contemplated that the sighting telescope be provided with a field of view substantially greater than that of the receiving telescope.

Although laser beams are preferred in the subject range finder 10, other pure radiation sources may be utilized and lasers having different emitting wavelengths may be used. When laser beams of substantially different wavelengths are used, as, for example, a neodymium laser emitting at 1.06 microns, it would be advantageous to shift the transmission of the dichroic film 31 to a higher level. In one successful form of the invention a laser frequency of 6943 Angstroms was found to be entirely successful. It will be observed that an operator looking through the sighting telescope 16 will see the contrasting appearing reticle dot or aperture 33 in his field of view and since said reticle dot is located directly on the optical axis 18 of the receiving telescope, the two telescopes will automatically be perfectly collimated to each other.

A modification of beam divider plate 20 is shown generally by the numeral 45 in FIG. 4 which may be used in place of the beam divider 20 of FIGS. 2 and 3. The structure differs therefrom in the filming techniques and in the reticle or sighting means. Considerable advantage in visibility of the sighting dot has been discovered by forming an aluminum film 46 directly on a glass substrate 47, said film having an aperture 48 formed therein. To reinforce the visibility of said aperture a peripheral rim 49 is provided by forming a shallow recessed groove 50 in the filmed face of the substrate or plate 47 which is filled with the aluminum filming material. Similarly to film 32 this film reflects all wavelengths of light.

Over the aluminum film 46 and aperture 48 is deposited a thin linkage film of dielectric such as magnesium fluoride 51, and over the film 51 is deposited a multilayer dichroic film 52, the magnesium fluoride film serving to improve the adhesion between the contiguous films. Alternatively, the magnesium fluoride film 51 might be considered to be one elemental layer of the multilayer dichroic film 52. The dichroic film 52 is intended to resemble in its structure and use the above-mentioned dichroic film 31. FIG. 5 shows how the plate 47 per se appears with the ring formed around the elliptical aperture 50.

A modification of the beam divider is shown generally at 55 in FIG. 7 wherein a metal plate or substrate 56 is used and is there shown in operative position with the principal projection axis 18 and lateral axis 21 meeting at the aforesaid focal point 19. On the front face of the plate 56 coincident with the focal point 19, an aluminum film 57 is deposited and at the focal point 19 an aperture 58 is formed obliquiely through the plate coaxially with the axis 18. In this form of beam divider, the radiation which is received from a narrow field of view passes through the aperture 58, as indicated by the arrows in FIG. 7, which acts as a diaphram for such rays and determines the angular subtense of the radiation beam received by the receiver 26 in FIG. 2. All other radiation from other parts of the field of view arriving at the beam divider 55 is reflected along the axis 21 to the telescope 16 as shown in FIG. 2. As shown in FIG. 8, the aperture 58 appears round when viewed in the direction of the axis 18 and appears as a contrasting dark spot in an illuminated field when viewed along axis 21, said spot being useable in a manner similar to conventional sighting reticles.

In operation, the operator aims the receiver-sighting assembly 14 and the transmitting unit 11 at a distant target area, the assembly 14 being aimed by positioning the reticle dot 33 precisely on the feature of the distant surface which is to be measured for distance and since the instrument is constructed as a portable unit the sighting axis as evidenced by the reticle dot 33 may be moved about relative to the distant object. A pulsed laser beam is sent out along the path 12 from the transmitter 11, said pulse to be reflected from the object 13 back along the path 25 and axis 18 to the ray sensing device 26 where the pulse is received and conducted therefrom by suitable connections 28 to the reader 27 where the time lapse between the sending of the pulse and reception of said pulse is recorded for every feature on the object whose range is to be measured.

DESCRIPTION OF THE SECOND FORM OF THE INVENTION

In the second form of the invention, as best shown in FIGS. 9, 10, and 11, is provided a radiant energy receiving telescope 60 which utilizes radiant energy above 6000 Angstroms or as required by the wavelength of the radiation emitting device and further provides a sighting telescope 61 which receives all wavelengths of light in the same manner as described in the first form of the invention.

Comprised in the radiant energy receiving telescope 60 is an objective lens 62 aligned on the optical axis 63 of said telescope. The image rays formed by lens 62 are received on the erect entrance face 64 of a right angled prism 65 and the rays are reflected from the oblique hypotenuse face 66 of the prism downwardly along an axis portion indicated by dotted line 67. The oblique face 66 is semi-reflectively coated preferably to reflect the image rays downwardly and for another purpose to be explained hereinafter.

Prism 65 is cemented crosswise to the hypotenuse face 68 of a larger right angle prism 69 covering half of said face, the coated face 66 of the prism 65 facing rearwardly away from the lens 62. Another prism 70 similar to prism 65 but facing toward the front instead of the rear, is cemented onto the remaining half of the hypotenuse face 68 so that these three prisms together form a number two type of Porro prism, also referred to as the Abbe modification of the Porro prism system.

The image rays which follow the direction of the axis portion 67 are deviated 90° along axis portion 71 and are next deviated 90° upwardly by the prism face 72 of prism 69 along a vertical axis portion 73 and enter the right-angle prism 70.

As mentioned hereabove, prisms 65 and 70 are alike but face in opposite directions so the hypotenuse face 74 of prism 70 crosses the plane of hypotenuse face 66.

At the point where axis portion 73 interesects the hypotenuse surface 74, a reticle 75 is formed as described hereinafter. The objective lens 62 is focused on the central section of reticle 75 which means that the length of the optical path between lens 62 and reticle 75 is the focal length of the objective lens.

On the prism face 74, still another right angle prism 76 is cemented with its hypotenuse face 77 erect and the received radiation rays which are projected along axis portion 73 and which are transmitted through the beam divider which is formed on the prism face 74 as is hereinafter described, are again deflected thereby 90° forwardly so that said rays emerge from said face 77 along a horizontal axis portion 78. Adjacent to the prism face 77 on axis portion 78 is located a collimating lens 79 which is focused on the aperture located on the prism face 74 and which collimates the transmitted beam, said rays being projected through a suitable monochromatic filter 100 which permits only radiation of the character emitted by the transmitter to pass and to be received by a suitable photoelectric device 80 aligned therewith which is connected as desired by a lead, not shown, to subsequent recorders, or other electrical devices.

It is noteworthy in the foregoing description that the prisms 65, 69, 70 and 76 are all permanently cemented together while they are held in perfect optical alignment and therefore never become misaligned, forming, in effect, an invariant optical assembly.

The visual sighting telescope 61 of FIGS. 9, 10, 11 and 12 utilizes some optical parts in common with the above-described receiving telescope 60. It comprises the objective lens 62 and prisms 65, 69 and 70 through which the light rays are directed to the aforesaid focal point 75. From the focal point 75, the hypotenuse face 74 deviates the light rays along a horizontal axis portion 81 to an eyepiece member generally indicated by numeral 82 which views an image of the distant surface 13.

Comprised also in the visual sighting telescope 61 is a reticle 85 formed at the axial intersection point 75, said reticle being in the form of a diaphragm which serves as the aperture stop of the telescope 60. As mentioned heretofore, the reticle 85 is located between the confronting prism faces forming the interface 74 so that the reticle is protected from mechanical and chemical damage and requires no servicing or realignment operations. Said reticle may be formed in the manner described in the foregoing description of the first form of the invention, that is, by an engraved demarcation ring and suitable combinations of aluminum and multilayer dichroic coatings similar in construction and function to the beam splitter described heretofore.

In order to use the above-described prism cluster as a component of both the receiving telescope 60 and sighting telescope 61, a beam divider in the form of a dichroic film, an engraved demarcation, and a reflective coating are laid down on the prism face 74 before prisms 69 and 76 are cemented together. The details pertaining to said films are set forth in detail in the foregoing description of FIG. 3 in connection with the description of the first form of the invention.

An auxiliary illuminated reticle may be provided for the sighting telescope 61 to facilitate location of the prism sighting reference reticle 75 under adverse illumination conditions. This auxiliary reticle system comprises a fifth right angle prism 86 which is constructed like prism 65 and is cemented thereto along the hypotenuse surface 66 to form an interface. Further comprised in the auxiliary reticle system is a lamp 87 which is mounted on an optical axis 88 in optical alignment with a condenser lens 89. On the front face of lens 89 a mask is formed having a cross-shaped open space which serves as a second bright line reticle 90 coarse sighting of the telescope 61 as mentioned heretofore. Condenser lens 89 substantially collimates the light passing through the open reticle 90 and projects it through the vertical entrance face 86' onto the semi-transparent interface 66 which reflects the light beam vertically along optical axis portion 91. An exclusion filter 101 is used to prevent light of the wave lengths emitted from the transmitter from being included in the reticle illumination and creating a false signal in the radiation receiver 80.

Figure 13:
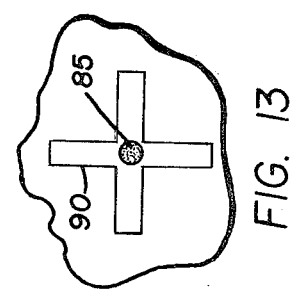
FIG. 13 is a schematic view of the sighting reticle arrangement used in said telescope.

Aligned on axis portion 91 is a fixed spherical mirror 92 which focuses said light rays onto the reticle 85 so that auxiliary reticle 90 appears as a luminous cross or bright-line reticle superimposed on reticle 85 as shown in enlarged detail in FIG. 13. Said mirror preferably consists of a lens having a focal length selected to image the bright-line reticle 90 onto the axial point 75, the outer lens surface being reflectively coated at 93 to act like a mirror.

The operation of the second form of the invention is substantially the same as the operation of the first form of the invention as follows. Light rays from the distant target 13 are projected onto the semi-reflecting surface 66 and are deviated therefrom along axis portions 67, 71 and 73 to the small aperture 85 where the rays are brought to a focus and the distant target is seen by the eyepiece which is focused on the reticle or aperture 85, the appearance of the aperture being demarcated with respect to the appearance of the surrounding field by contrasting color and/or by an engraved demarcation as described in the first form of the invention.

Generally speaking because of the character of the film formed on interface 74, the visible part of the light is reflected to the eyepiece 82 while the infra-red portion of the radiation passes the film along axis portion 73 and is reflected forwardly by prism 76 along axis portion 78, is collimated by the lens 79 and is detected by the I-R sensing member or detector 80, the response thereof being conducted by means, not shown, to a recorder like that shown in FIG. 1.

For rough sighting of the instrument or under adverse lighting conditions, the projected luminous reticle 90 is used as an aiming device. For accurate location of the object to be sighted and illuminated or ranged, the reticle 85 is used. As described heretofore, the invariant relationship between the reticle 85 and the aperture through which radiation is passed to the detector, all being comprised in the same physical unit, produce a completely reliable and "fail-safe" instrument.

The inventors do not wish to limit the invention to a range finder, as it is believed the device may be more broadly considered to be a radiation receptor. As described above, the laser is considered the radiation source which is located near the receiver. The radiation source might be remote from the receiver such as a ship or airplane radiating a signal and the radiation beam would be picked up by the receiver and sighting system. The objective means used by the sighting system and receiver is radiation discriminating by inclusion of a suitable reflector and aperture constructed in a manner similar to the structure shown in FIG. 3. With particular reference to the directional properties of the radiation receiver, the larger field of the sighting telescope using 6000 Angstroms or less radiation wave length would provide a directional receptor of a sufficient angle to initially receive a radiation signal, and the smaller aperture using 6000 Angstroms or greater in the receiver having an angular dimension of substantially one milli-radian would provide accurate directional finding of the radiation source. The scanning of the receptor may be done manually or by use of a scanning device to rotate the receptor like a radar antenna. An electrical device similar to a signal seeking tuner may be used as a locking device which could lock the receiver or limit the scan once the general direction is established. More than one aperture and filter with a corresponding frequency sensor may be used to assist in locking or limiting the direction of scan of the receiver. The scanning device or locking circuit is not shown in the disclosure as it is believed it could be patterned after conventional electronic circuitry.

Although only certain specific forms and arrangements of the present invention have been shown and described in detail, it will be understood that changes may be made in the details of construction and the arrangement of the parts and substitutions may be made therein without departing from the spirit of the invention as defined in the claims here appended.

We claim:
1. An opto-electronic type of range finder characterized by a radiation receiving telescope for use with infrared radiation and a sighting telescope for use with visible radiation and comprising
    a single objective lens used in common with both telescopes,
    a beam divider intersecting obliquely the optical axis of the lens at its prime focus to form a reflected beam and a transmitted beam,
    a semi-reflecting film formed on said divider which produces said reflected and transmitted beams,
    eyepiece means operatively arranged to receive said reflected beam,
    means operatively arranged for sensing the transmitted beam, and
    means forming axially a sighting reticle on said film at substantially said focus whereby said reticle when viewed through said eyepiece means appears as a mark in a contrasting field and serves as an aiming element for directing the instrument and when constructed in this manner the two aforesaid telescopes are well collimated to each other so that radiation from the object point aligned with the reticle mark falls onto said sensing means.

2. Beam receiving apparatus for an opto-electronic type of range finder comprising an infrared radiation receiving telescope aligned on a first optical axis and further comprising a visual sighting telescope aligned on a second axis substantially parallel to the first axis,
    an objective lens and
    an infrared radiation receiving device aligned with each other on said first axis to form said infrared receiving telescope,
    a beam divider positioned inclinedly to the first axis and extending through the focal point of said objective lens,
    a semi-reflecting film formed on said beam divider which transmits infrared radiation to said apparatus and reflects visible light laterally of said axis,
    means including said objective and beam divider operatively combined to form a sighting telescope, and
    means forming symmetrically of the first axis a reticle on said beam divider, the reticle being free of said film to provide a contrasting appearance thereof,
    whereby said receiving apparatus may be visually aligned on a distant target by aligning the retical with the target.

3. Beam receiving apparatus for an opto-electronic type of range finder comprising an infrared radiation receiving telescope aligned on a first optical axis and further comprising a visual sighting telescope aligned on a second axis located substantially parallel to the first axis,
    means including an objective lens and an infrared radiation receiving device operatively aligned with each other on said first axis to form said infrared receiving telescope,
    a beam divider positioned inclinedly to the first axis and extending through the focal point of said objective lens,
    means including said objective and beam divider optically aligned to form said sighting telescope,
    a semi-reflecting film formed on said beam divider which reflects visible light into said sighting telescope and transmits infrared radiation in the direction of said radiation receiving device,
    a totally reflectng film formed in overlying contact with the first film, and
    means forming a small aperture symmetrically of said first axis in the films on the beam divider at a point which is common to the axes of both telescopes so that one is collimated to the other and simultaneously an aperture is provided for the passage of infrared radiation through the beam divider, said aperture further providing a small aiming spot of contrasting appearance in the light field of view.

4. An opto-electronic type of range finder as set forth in claim 3 wherein the order of deposition of the semi-reflecting film and totally reflecting film is reversed so that the totally reflecting film is formed on said beam divder, and the semi-reflecting film is formed in overlying contact with the first semi-reflecting film.

5. An opto-electronic laser-powered range finder as set forth in claim 3 wherein said semi-reflecting film is dichroic and is composed of dielectric materials having thicknesses operatively formed to reflect light having a wave length less than the operating wave length of the laser, said film furthermore being operatively formed to transmit those wave lengths of light emitted by the laser.

6. An opto-electronic type of range finder characterized by
   a laser beam receiving telescope,
   a visual sighting telescope,
   an objective lens which constitutes a part of each said telescope and is located on a first optical axis on which the first telescope is aligned,
   a beam divider intersecting said first axis obliquely at the focal point of said lens,
   a laser beam responsive device aligned on said first axis in position to receive transmitted radiation from said beam divider,
   an illuminated reticle aligned on a second optical axis lying substantially parallel to the first axis,
   a plane mirror aligned obliquely on said second axis in a position to receive light reflected by said beam divider and deviate it along said second optical axis,
   an erector lens aligned at least partly on said second axis and at least partly on the lateral axis segment between the beam splitter and said plane mirror and having a focal length as determined by the expression $$\frac{1}{F} = \frac{1}{S} + \frac{1}{S_1}$$

where $f$ is the focal length of the collective lens, S is the distance from the first-mentioned focal point to the erector lens and $S_1$ is the distance from the lens to the reticle,
   an eyepiece aligned on the second optical axis and focused on the reticle,
   a multilayer dichroic film formed on said beam divider which transmits the infrared emission of the laser to said laser responsive device and reflects the visible light to the sighting telescope along said second axis, and
   means forming a small sighting reticle in said film concentric with the first axis substantially at the first focal point which together with the illuminated reticle provides aiming means for the instrument.

7. An opto-electronic range finder according to claim 5 further characterized by
   said beam divider comprising a plate formed of opaque material,
   means forming a small open aperture through said material concentrically with the first axis which serves as a sighting device, and
   a reflective surface formed on the objective side of said plate which reflects all visible radiation toward said sighting telescope.

8. An opto-electronic range finder according to claim 5 further characterized by said beam divider including
   a transparent substrate upon which ring-like sighting means are formed on one side of the substrate concentrically of said first axis,
   a totally reflecting metallic film formed on said side of the substrate from said sighting means outwardly thereof whereby a transparent aperture is formed in said film,
   a multilayer dichroic film formed over the entire surface thereof, said dichroic film being operatively formed to transmit the emitted beam of a laser and to reflect substantially all light having a wave length less than the laser emission.

9. An opto-electronic type of range finder according to claim 6 characterized by
   said small sighting reticle being round and having a transverse measurement of substantially 1.0 milliradian when projected by the objective lens into the field of view.

10. An opto-electronic type of range finder comprising
    a laser beam receiving telescope aligned on a first optical axis,
    a visual sighting telescope partly aligned on a second optical axis, said sighting telescope having a comparatively large field of view to act as a finder for distant objects,
    said laser beam receiving telescope including an objective lens aligned on a first optical axis,
    a large right prism having a hypotenuse surface facing upwardly and positioned crosswise to said axis,
    a cube cemented across one end of the first said hypotenuse surface and having a diagonal interface which substantially coincides at its lower side with the long edge of said hypotenuse surface which is farthest from said objective,
    a right prism having a short side cemented crosswise of the other end of the first hypotenuse surface, the hypotenuse surface of said prism having its lower edge substantially coincident with the long edge of the first hypotenuse surface nearest to said objective,
    another right prism which is cemented on one of its short sides to the last-mentioned hypotenuse surface so that it lies normal to the aforesaid interface and the hypotenuse surface thereof is an exit face and stands vertical,
    whereby radiation from the lens is reflected downwardly by said cube interface to the short sides of the first right prism where the radiation is retrodirected upwardly through the last-mentioned right prism and exits forwardly from the vertical front surface of the prisms along a terminal portion of an axis parallel to said first axis,
    a laser beam sensing device aligned on said terminal axis portion,
    a collimator lens and a narrow wave length discriminating filter aligned on the terminal axis portion between the prisms and sensing device, the lens being operatively constructed to direct the laser beam radiation into said sensing device,
    a beam divider formed on the interface between the two right prisms consisting of a film which transmits infrared radiation of said beams and reflects visible light incident thereon,
    means forming in said film a sighting reticle symmetrically of said first axis substantially at the focal point of said objective lens, and
    an eyepiece lens optically aligned with said reticle and focused thereon whereby the two telescopes are collimated to each other.

11. An opto-electronic type of range finder as set forth in claim 10 characterized by a lamp aligned on a horizontal axis which is coextensive with the axis of the objective and is located on the eyepiece side on said cube,
    a condenser lens aligned on said horizontal axis next to said lamp for forming a light beam,
    an apertured mask operatively formed to provide a luminous reticle mark in axial alignment with said condenser lens, said mark being projected along said horizontal axis, and a spherically formed reflector optically aligned with a vertical optical axis portion which meets with said horizontal axis at the interface of said cube, said reflector receiving the light from said reticle and forming therefrom an image which is projected upon said sighting reticle whereby coarse aiming of the telescopes may be effected.

References Cited

UNITED STATES PATENTS 3,143,588  8/1964  Donald et al. _____ 356—4

RODNEY D. BENNETT, Jr., Primary Examiner

J. P. MORRIS, Assistant Examiner